United States Patent [19]

Sato et al.

[11] Patent Number: 4,631,261

[45] Date of Patent: Dec. 23, 1986

[54] METHOD FOR PREPARING HYDROCARBON CATALYTIC CRACKING CATALYST COMPOSITIONS

[75] Inventors: Goro Sato; Masamitsu Ogata; Takanori Ida, all of Kita-Kyushu, Japan

[73] Assignee: Catalysts & Chemicals Industries Co., Ltd., Tokyo, Japan

[21] Appl. No.: 713,075

[22] Filed: Mar. 15, 1985

[30] Foreign Application Priority Data

Mar. 15, 1984 [JP] Japan ................................. 59-49968

[51] Int. Cl.$^4$ ............................................. B01J 29/06
[52] U.S. Cl. .......................................... 502/65; 502/68
[58] Field of Search ........................... 502/65, 10, 8, 68

[56] References Cited

U.S. PATENT DOCUMENTS

| | | |
|---|---|---|
| 3,930,987 | 1/1976 | Grand ................................ 502/65 X |
| 3,957,689 | 5/1976 | Ostermaier et al. .................... 502/65 |
| 4,407,735 | 10/1983 | Sawamura ............................ 502/10 |
| 4,411,771 | 10/1983 | Bambrick et al. ................. 502/10 X |
| 4,480,047 | 10/1984 | Beck et al. ............................ 502/65 |

*Primary Examiner*—Carl F. Dees
*Attorney, Agent, or Firm*—Flynn, Thiel, Boutell & Tanis

[57] ABSTRACT

A catalyst composition suitable for catalytic cracking of a heavy hydrocarbon oil containing large amounts of metal contaminants is prepared by the steps of spray-drying an aqueous slurry containing a flash calcined alumina obtained by contacting an aluminum hydroxide prepared Bayer's process with a hot air of 350°–700° C. for 5 seconds or less, clay being predominantly composed of silica and alumina, a precursor of a siliceous inorganic oxide and a crystalline aluminosilicate; washing this particle until the alkali metal content therein is reduced to 1.0 wt % or less as oxide; and thereafter incorporating a rare earth component in the particle.

7 Claims, No Drawings

METHOD FOR PREPARING HYDROCARBON CATALYTIC CRACKING CATALYST COMPOSITIONS

BACKGROUND OF THE INVENTION

The present invention relates to a method for preparing hydrocarbon cracking catalyst compositions, in particular relates to a method for preparing catalyst compositions which exhibit high catalytic activity, gasoline selectivity and depressed degree of formation of coke and further more display superior stability to heat and steam when used in catalytic cracking of heavy hydrocarbon containing large amounts of metals such as vanadium, nickel, iron, copper and the like.

Catalytic cracking of hydrocarbon originally aims at the production of gasoline. Therefore, catalysts used herein are demanded to exhibit high catalytic activity and gasoline selectivity. In addition, high thermal and hydrothermal stability is also one of the requisites for cracking catalysts because it is customary in the hydrocarbon catalytic cracking process to repeat many times the operation which comprises regenerating the deactivated catalysts which have been used in the reaction and thereafter employing the thus regenerated catalysts again in the reaction. Under these circumstances, the catalysts used in catalytic cracking of hydrocarbon have usually been improved by taking various means. For instance, the performance of the typical cracking catalyst composition which comprises dispersing a crystalline aluminosilicate in an inorganic oxide matrix has been improved by introducing a rare earth component in said composition by means of ion exchange, impregnation or the like or by dispersing a rare earth exchanged crystalline aluminosilicate in the matrix. And, these improvements have achieved considerable results, and the thus improved cracking catalyst has displayed its performance to a satisfactory degree so far as the heavy hydrocarbon feed oil used is not low grade too much, in other words does not contain large amounts of metallic contaminants.

In recent years, however, it is becoming necessary with deterioration of the oil situation to employ low grade heavy hydrocarbon oils such as residual oils containing large amounts of metals such as vanadium, nickel and the like as a feed stock for catalytic cracking processes without any pre-treatment. However, in case the low grade oil of this type is subjected to catalytic cracking processes using a conventional catalyst, the catalyst has been poisoned severely by metallic contaminants contained in the feed oil, and consequently the primary purpose of catalytic cracking can not be accomplished because the catalytic activity and gasoline selectivity of said poisoned catalyst are destroyed and the amounts of coke and gases generated increase markedly. Accordingly, when subjecting the low grade heavy hydrocarbon containing a large amount of metallic contaminants to catalytic cracking, there have usually been employed the way of suppressing the deposit amount of metal of the catalysts by increasing the amount of catalyst used, the way of passivating the metal by adding an antimony compound in the feed oil, the way of prehydrotreating a feed oil for removing the metallic contaminants and the like contained in the feed oil to some extent and then subjecting same to catalytic cracking, and the like. However, these conventional ways can never be recommended because the running cost increases.

Some of the inventors of this invention, M. Ogata and T. Ida, Have previously proposed, together with Y. Nishimura, a method for preparing hydrocarbon cracking catalyst compositions which can obtain not only the gasoline fraction but also the intermediate fraction such as kerosene or the like in a high yield (see Japanese Laid Open Patent Application No. 163439/1983 Specification). This method comprises spray drying an aqueous slurry containing a flash calcined alumina obtained by contacting the aluminum hydroxide prepared by Bayer's process with a hot air for a short time, kaolin, a precursor of a siliceous matrix and a crystalline aluminosilicate.

We have found that the catalyst obtained by introducing a rare earth component to the catalyst composition prepared by the above mentioned method exhibits a superior performance as the cracking catalyst in treating the low grade heavy hydrocarbon oil containing large amounts of metallic contaminants, in marked contrast to the catalyst of the same kind but free from said flash calcined alumina.

SUMMARY OF THE INVENTION

The method for preparing catalyst compositions according to the present invention is characterized by the steps of spray drying an aqueous slurry of a mixture comprising a flash calcined alumina obtained by contacting an alumina hydroxide prepared by Bayer's process with a hot air of 350°–700° C., clay predominantly composed of silica and alumina, a precursor of a siliceous inorganic oxide and a crystalline aluminosilicate to thereby form a fine spherical particle, washing this particle until the alkali metal content therein is reduced to 1.0 wt% or less as oxide, and thereafter incorporating a rare earth component in the particle.

DETAILED DESCRIPTION

The flash calcined alumina used in the present invention can be obtained by contacting the alumina hydroxide prepared by Bayer's process with a hot air of 350°–700° C., preferably 550°–650° C., at a contact time of 5 seconds or less for rapid dehydration. The amount of this flash calcined alumina used is selected from the range of 10–30% by weight of a final catalyst composition. As the clay which is predominantly composed of silica and alumina, kaolin, bentonite and the like are usable, and the amount of the clay used may be selected from the range of 30–50 wt% of the final catalyst composition. As the precursor of the siliceous inorganic oxide, a silicic acid solution, silica hydrosol, silica hydrogel, sodium silicate and the like are usable, and the suitable amounts of these precursors used are determined so that the final catalyst compositions may contain the silica derived from the precursors in the amounts of 5–50 wt% as $SiO_2$. As the crystalline aluminosilicate, those employed conventionally in the preparation of cracking catalyst may be used also in the present invention, and hydrogen exchanged, ammonium exchanged and rare earth exchanged crystalline aluminosilicates are included therein. The amount of the crystalline aluminosilicate used in the present invention is in the range of 3–40 wt% of the final catalyst composition.

According to the present method, the above mentioned flash calcined alumina, clay predominantly composed of silica and alumina, precursor of a siliceous inorganic oxide and crystalline alumino-silicate are mixed, and the aqueous slurry of this mixture is spray-dried in a conventional manner to thereby prepare a fine spherical particle. The aqueous slurry in this case may be regulated to have an optional solid concentration so far as spray drying is applicable, and the spray drying conditions in this case may employ those which have normally been employed in the preparation of cracking catalyst.

The fine spherical particle prepared by spray drying is washed typically with water until the alkali metal amount contained herein is reduced to 1.0 wt% or less as oxide. Then, a rare earth component is incorporated into the fine spherical particle. This incorporation is carried out by impregnating the fine spherical particle with the aqueous solution of a rare earth compound. As the rare earth compound, there can be employed a chloride and/or a sulfate of rare earth metal such as lanthanum, cerium and the like. The rare earth component is preferable to be distributed uniformly on the particle surface. Therefore, it is preferable that incorporation of said component should be carried out for instance by the way of preparing for an aqueous rare earth compound solution regulated to have a pH in the range of 4.5–5.5 in the volume more than two times that of the particles and dipping the particle therein at a temperature more than 60° C. and at least for 10 minutes rather than the way of spraying the aqueous rare earth compound solution on the particles.

It is important that the amount of the rare earth component incorporated should be controlled to be within the range of 0.3–5 wt% of the final catalyst composition as oxide. In case said amount is less than this range, it is impossible to obtain a catalyst composition effective for catalytic cracking of the heavy hydrocarbon oil containing large amounts of metallic contaminants. And, incorporation of more than 5 wt% of the rare earth component is not profitable economically because no special effect can be expected therefrom. The catalyst composition according to the present invention can be obtained by water-washing the fine spherical particle impregnated with the aqueous rare earth compound solution until anions derived from the rare earth compound used such, for instance, as $Cl^-$, $SO_4^{--}$ and the like can not be detected in the washing liquid, and thereafter drying said particle.

The catalyst composition prepared by the method of the present invention can prevent the amounts of gas and coke produced from unusual increasing and maintain its catalytic activity and gasoline selectivity on the high level even when about 10,000 ppm of metals such as vanadium, nickel and the like have deposited thereon. These characteristics are estimated to be derived from the synergistic function of the flash calcined alumina and the rare earth oxide present in said catalyst composition.

That is, the flash calcined alumina used in the present invention reacts with the precursor of the siliceous inorganic oxide during the preparation of the catalyst composition, and consequently the surface of the flash calcined alumina particle is changed into silica-alumina but the inside of the flash calcined alumina particle still retains the qualities originated in the flash calcined alumina. When the fine particle of the composition containing the flash calcined alumina like this is contacted with the aqueous rare earth compound solution, a part of the rare earth combines with acid points within the silica-alumina formed on the surface area of the flash calcined alumina particle. According to the experimental results obtained by the inventors of the present invention, oxides of metals such as vanadium, nickel and the like contained in the crude oil have the strongest affinity with the rare earth metal oxide among the other metal oxides. Accordingly, it is estimated that the metals such as vanadium, nickel and the like deposited on the catalyst are first fixed by the rare earth metal combined the surface area of the flash calcined alumina particles, then the fixed metals are dispersed inside the flash calcined alumina particle while the catalyst is exposed to a high temperature, and the dispersed metals react with alumina for passivation. Due to this, the metals deposited on the catalyst do not bring about any crystal breakage of the crystalline aluminosilicate. Therefore, the catalyst composition of the present invention is considered to display the above mentioned characteristics.

Accordingly, it is very important for the present invention to incorporate a specified amount of the rare earth component in the fine spherical particle obtained by spray drying, and therefore it is impossible to replace this rare earth component by rare earth cation of the rare earth exchanged crystalline aluminosilicate. This is because the rare earth component introduced in the fine spherical particle by the method of the present invention is different in function from the rare earth component introduced in the crystalline aluminosilicate by the ion-exchange. In this connection, it is to be noted that the rare earth component introduced by the method of the present invention, as aforesaid, takes part in passivation of metals deposited on the catalyst, while the rare earth metal introduced in the crystalline aluminosilicate by the ion-exchange merely takes part in improving the thermal and hydrothermal stability of the crystalline aluminosilicate.

The present invention will be explained more concretely by showing Examples together with Comparative Example. Antecedently thereto, a preparation example of the flash calcined alumina used in each Example will be shown as Reference Example.

REFERENCE EXAMPLE

A flash calcined alumina (FCA) was obtained by flowing the aluminum hydroxide ($Al_2O_3.3H_2O$) prepared by Bayer's process in a tube in which a hot air of 650° C. was flowing, so that the contact time might be 2 seconds. This flash calcined alumina was identified to be the crystal of chi-alumina by X-ray diffraction. The composition thereof was $Al_2O_3.0.5H_2O$.

COMPARATIVE EXAMPLE

A commercially available water glass No. 3 (JIS K 1408) was diluted to thereby prepared a water glass solution having a $SiO_2$ concentration of 11.2%. A 10.5% aluminum sulfate solution was prepared separately. The water glass solution and the aluminum sulfate solution were poured into a vessel in the ratios of 20 l/min. and 10 l/min. respectively, and were mixed to thereby prepare a gel. This gel was aged at 65° C. for 3.5 hours, and then a water glass solution was added thereto for adjusting the pH to 5.8 and stabilized. This gel was added with a 30% aqueous slurry of rare earth exchanged zeolite Y, designated as RE-Y, (exchange rate was 67%) so that the zeolite content might become 20% based on the weight of the final catalyst composition. This mixture was spray-dried in a hot air at a temperature of 220° C. and then washed and dried to obtain a catalyst composition. The alkali metal content of this composition was 0.5 wt% as $Na_2O$.

The aforesaid composition was classified into four parts. The first part was named Catalyst A-1. The second part was suspended in a toluene solution of nickel naphthenate and vanadium naphthenate and stirred for 1 hour. Thereafter, the toluene was evaporated under reduced pressure to thereby prepare Catalyst A-2. The nickel content and the vanadium content in Catalyst A-2 were controlled to be 3000 ppm and 600 ppm respectively.

The third part was dipped in a rare earth chloride solution prepared so that the rare earth metal contained in the final composition might be 2 wt% as oxide, and stirred at 60° C. for 1 hour, thereafter was subjected to dehydration and filtration with Nutsche, further was washed with a hot water until no chlorine anion can be detected in the filtrate, and then was dried to thereby prepare Catalyst A-3. And, the same amount of the rare earth component was introduced in the fourth part by the same process as the third part, and the the same amounts of nickel and vanadium were deposited by the same process as the second part, thereby obtaining Catalyst A-4.

EXAMPLE 1

A commercially available water glass No. 3 was diluted to thereby prepare a water glass solution having a $SiO_2$ concentration of 12.73%. A sulfuric acid having a concentration of 25% was prepared separately. The water glass solution and the sulfuric acid were mixed in the ratios of 20 l/min. and 5.6 l/min. continuously for 10 minutes, thereby preparing a silica hydrosol. This silica hydrosol was added with kaolin and FCA obtained by Reference Example so that their weights might become 50% and 10% respectively based on the weight of the final composition, and was further added with an aqueous slurry of RE-Y (exchange rate 67%), whose solid content had been previously adjusted to be 30%, so that the zeolite content might become 15% based on the weight of the final composition. This mixture was washed and then dried to obtain a composition.

This composition was classified into plural parts. One of them was named Catalyst B-1. The remaining parts were treated by the same procedure as final composition. This mixture was spray-dried in a hot air at a temperature of 220° C., and same was washed and then dried to obtain a composition. This composition was classified into plural parts. One of them was named Catalyst C-1. The remaining parts were treated by the same procedure as Comparative Example to thereby prepare the following 3 kinds of catalyst.

TABLE 2

| Catalyst | C-2 | C-3 | C-4 |
|---|---|---|---|
| Rare earth content, wt % (calculated as oxide) | 0 | 2.0 | 2.0 |
| Nickel, ppm | 3,000 | 0 | 3,000 |
| Vanadium, ppm | 6,000 | 0 | 6,000 |

EXAMPLE 3

The silic hydrosol obtained according to the same procedure as Example 1 was added with kaolin and FCA so that their weights might become 40% and 20% respectively based on the weight of the final composition. The same was further added with a 30% aqueous slurry of ammonium exchanged zeolite Y, designated as $NH_4$-Y, (exchange rate 92%) so that the zeolite content might become 20% based on the weight of the final composition. This mixture was spray-dried in a hot air at a temperature 220° C., and same was washed and then dried to obtain a composition.

This composition was classified into plural parts. One of them was named Catalyst D-1. The remaining parts were treated by the same procedure as Comparative Example to thereby obtain the following 3 kinds of catalyst.

TABLE 3

| Catalyst | D-2 | D-3 | D-4 |
|---|---|---|---|
| Rare earth content, wt % (calculated as oxide) | 0 | 2.0 | 2.0 |
| Nickel, ppm | 3,000 | 0 | 3,000 |
| Vanadium, ppm | 6,000 | 0 | 6,000 |

CATALYTIC PERFORMANCE TEST

Each catalyst obtained in the above mentioned Comparative Example and Examples was subjected to catalytic activity test. Before said test starts, each catalyst

TABLE 1

| Catalyst | B-2 | B-3 | B-4 | B-5 | B-6 | B-7 | B-8 | B-9 | B-10 |
|---|---|---|---|---|---|---|---|---|---|
| Rare earth content, wt % (calculated as oxide) | 2.0 | 2.0 | 0.2 | 1.0 | 4.0 | 6.0 | 2.0 | 2.0 | 2.0 |
| Nickel, ppm | 0 | 3,000 | 3,000 | 3,000 | 3,000 | 3,000 | 300 | 1,700 | 6,000 |
| Vanadium, ppm | 0 | 6,000 | 6,000 | 6,000 | 6,000 | 6,000 | 600 | 3,300 | 12,000 |

Comparative Example to thereby prepare the following 9 kinds of catalyst.

EXAMPLE 2

The silica hydrosol obtained according to the same procedure as Example 1 was added with kaolin and FCA so that their weights might become 50% and 10% respectively based on the weight of the final composition. The same was further mixed with a 30% aqueous slurry of RE-Y (exchange rate 99%) so that the zeolite content might become 20% based on the weight of the was subjected to 6 hours' treatment at 770° C. in a 100% steam atmosphere, and then was calcined at 600° C. for 1 hour. A hydrodesulfurized vacuum gas oil (DSVGO) was employed as the feed oil. As the reaction conditions there were employed the following conditions: reaction temperature=482° C., WHSV=16 $hr^{-1}$ and catalyst-/oil ratio=3.

The test resutls are shown in the following table together with the compositions of respective catalysts.

TABLE 4

| Catalyst | A-1 | A-2 | A-3 | A-4 | B-1 | B-2 | B-3 | B-4 | B-5 | B-6 | B-7 | B-8 | B-9 | B-10 |
|---|---|---|---|---|---|---|---|---|---|---|---|---|---|---|
| Matrix | $SiO_2$—$Al_2O_3$ | | | | $SiO_2$ | | | | | | | | | |
| Amount wt. % | 80 | | | | 20 | | | | | | | | | |

TABLE 4-continued

| Additive | | | | | | | | | | | | | | | |
|---|---|---|---|---|---|---|---|---|---|---|---|---|---|---|---|
| FCA wt. % | — | | | | | | | | 10 | | | | | | |
| Kaolin wt. % | — | | | | | | | | 50 | | | | | | |
| Type of zeolite | RE—Y | | | | | | | | RE—Y | | | | | | |
| Exchange rate | 67% | | | | | | | | 67% | | | | | | |
| Amount wt. % | 20 | | | | | | | | 20 | | | | | | |
| Incorporated rare earth, wt. % | 0 | 0 | 2.0 | 2.0 | 0 | 2.0 | 2.0 | 0.2 | 1.0 | 4.0 | 6.0 | 2.0 | 2.0 | 2.0 |
| Deposited metal | | | | | | | | | | | | | | | |
| Ni ppm | 0 | 3,000 | 0 | 3,000 | 0 | 0 | 3,000 | 3,000 | 3,000 | 3,000 | 3,000 | 300 | 1,700 | 6,000 |
| V ppm | 0 | 6,000 | 0 | 6,000 | 0 | 0 | 6,000 | 6,000 | 6,000 | 6,000 | 6,000 | 600 | 3,300 | 12,000 |
| Cracking test result | | | | | | | | | | | | | | | |
| Conversion wt. % | 76.5 | 41.7 | 76.7 | 48.3 | 74.3 | 76.6 | 59.9 | 54.5 | 58.5 | 62.9 | 63.1 | 75.3 | 70.1 | 47.8 |
| Hydrogen wt. % | 0.05 | 0.46 | 0.05 | 0.48 | 0.03 | 0.03 | 0.33 | 0.32 | 0.33 | 0.33 | 0.34 | 0.10 | 0.22 | 0.37 |
| $C_5^+$ gasoline wt. % | 50.7 | 24.5 | 51.3 | 29.2 | 52.4 | 53.7 | 41.5 | 37.0 | 39.7 | 42.2 | 42.3 | 51.8 | 48.0 | 31.5 |
| Coke wt. % | 4.3 | 3.9 | 4.0 | 4.2 | 2.9 | 2.9 | 3.2 | 2.9 | 3.1 | 3.2 | 3.3 | 3.2 | 3.6 | 2.1 |

| Catalyst | C-1 | C-2 | C-3 | C-4 | D-1 | D-2 | D-3 | D-4 |
|---|---|---|---|---|---|---|---|---|
| Matrix | SiO$_2$ | | | | SiO$_2$ | | | |
| Amount wt. % | 20 | | | | 20 | | | |
| Additive | | | | | | | | |
| FCA wt. % | | 10 | | | | 20 | | |
| Kaolin wt. % | | 50 | | | | 40 | | |
| Type of zeolite | | RE—Y | | | | NH$_4$—Y | | |
| Exchange rate | | 99% | | | | 92% | | |
| Amount wt. % | | 20 | | | | 20 | | |
| Incorporated rare earth, wt. % | 0 | 0 | 2.0 | 2.0 | 0 | 0 | 2.0 | 2.0 |
| Deposited metal | | | | | | | | |
| Ni ppm | 0 | 3,000 | 0 | 3,000 | 0 | 3,000 | 0 | 3,000 |
| V ppm | 0 | 6,000 | 0 | 6,000 | 0 | 6,000 | 0 | 6,000 |
| Cracking test result | | | | | | | | |
| Conversion wt. % | 76.7 | 56.3 | 77.9 | 61.6 | 55.1 | 37.2 | 58.6 | 44.5 |
| Hydrogen wt. % | 0.03 | 0.43 | 0.03 | 0.33 | 0.07 | 0.32 | 0.06 | 0.30 |
| $C_5^+$ gasoline wt. % | 52.2 | 36.2 | 54.3 | 41.8 | 39.3 | 27.5 | 43.6 | 32.5 |
| Coke wt. % | 3.0 | 3.5 | 3.0 | 3.1 | 1.4 | 1.6 | 1.2 | 1.6 |

$C_5^+$ gasoline: Range of boiling point $C_5$–204° C.

What is claimed is:

1. A method for preparing a catalyst composition for cracking hydrocarbons, which comprises:
   a. preparing flash-calcined alumina particles by heating alumina hydroxide, which has been prepared by the Bayer process, with hot air having a temperature of from 350° to 700° C., for 5 seconds or less,
   b. mixing (i) said flash-calcined alumina particles with (ii) clay predominantly composed of silica and alumina, (iii) crystalline aluminosilicate zeolite, (iv) a precursor of siliceous inorganic oxide, and (v) water, to form an aqueous slurry,
   c. spray drying said slurry to obtain fine spherical catalyst particles, said catalyst particles containing cores of said flash-calcined alumina particles covered by exterior shells of silica-alumina formed by reaction between said flash-calcined alumina and said precursor;
   d. washing said catalyst particles until the alkali metal content thereof is 1.0 wt. % or less, calculated as the oxide, and
   e. then substantially uniformly impregnating said catalyst particles with a rare earth component.

2. A method according to claim 1 wherein the amount of said rare earth component introduced in the dealkalized fine spherical catalyst particles is 0.03–5 wt% of the final catalyst composition calculated as the oxide.

3. A method according to claim 1 wherein said precursor of a siliceous inorganic oxide is selected from the group consisting of a silicic acid solution, silica hydrosol, silica hydrogel and sodium silicate.

4. A method according to claim 1 wherein said clay is at least one member selected from the group consisting of kaolin and bentonite.

5. A method according to claim 1 wherein said crystalline aluminosilicate zeolite is at least one member selected from the group consisting of hydrogen exchanged, ammonium exchanged and rare earth exchanged crystalline aluminosilicate zeolites.

6. A method according to claim 2 in which said catalyst composition contains 10–30% of the flash calcined alumina, 30–50% of the clay, 5–50% of the silica derived from the precursor and 3–40% of the crystalline aluminosilicate, based on the weight of the final catalyst composition.

7. A method according to claim 1 wherein in step (e), the spray-dried catalyst particles are dipped in an impregnating liquid comprising an aqueous solution of the chloride or sulfate of the rare earth metal for impregnating the catalyst particles with the rare earth metal component and then the catalyst particles are washed to remove the chloride or sulfate anions.

* * * * *